J. H. DOWING.
Tea Kettle.
No. 86,008.
Patented Jan. 19, 1869.
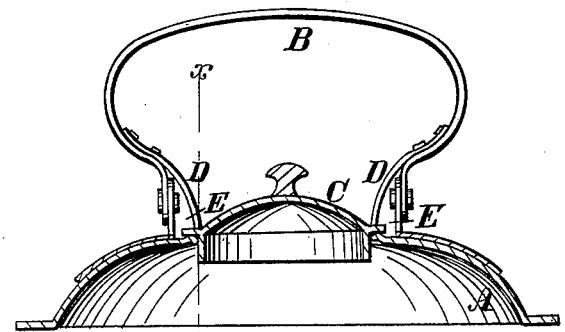
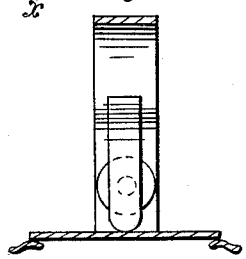
Witnesses.
E. Wolff
Wm. A. Morgan
Inventor
Joseph H. Downing
pr Munn & Co
Attorneys

JOSEPH H. DOWNING, OF HEALDSBURG, CALIFORNIA.

Letters Patent No. 86,008, dated January 19, 1869.

IMPROVEMENT IN TEA-KETTLES.

The Schedule referred to in these Letters Patent and making part of the same

*To all whom it may concern:*

Be it known that I, JOSEPH H. DOWNING, of Healdsburg, in the county of Sonoma, and State of California, have invented a new and useful Improvement in Tea-Kettles; and I do hereby declare that the following is a full, clear, and exact description thereof, which will enable those skilled in the art to make and use the same, reference being had to the accompanying drawings, forming part of this specification.

This invention relates to a new and useful improvement in kettles for boiling water and other liquids; and It consists in attaching to the handle or bail of such kettle, strips or pieces of metal, in such a manner that the lower ends of such pieces will rest on (or nearly on) the cover of the kettle, when the bail is in a vertical position, and so that when the bail is turned down, the cover can be removed, as will be hereinafter more fully described.

Figure 1 represents a vertical section of the upper portion of a tea-kettle, with the bail in a vertical position, with the said improvement attached.

Figure 2 is a section through the line x x of fig. 1, showing the inside of a section of a bail, giving a side view of the pieces attached.

A is the top of the kettle;

B is the bail;

C is the cover; and

D represents the pieces which are attached to the inside of the bail, opposite each of the ears E of the kettle.

These pieces D are rigidly attached to the bail, and are curved, so that their lower ends rest on (or nearly on) the top of the flange of the cover, when the bail is up, as represented in the drawing.

When in this position, the kettle can be tipped, or turned in any direction, and the cover will retain its position.

Should the kettle be accidentally dropped, the cover would not be likely to fly off, and allow the liquid to escape and scald children, or other persons.

The pieces D D may be attached in any manner to copper or other sheet-metal kettles, and they may be cast on the bails of cast-iron kettles, or riveted, or secured thereto in any desired manner.

When the bail is turned down, and only then, can the cover be removed.

Many of the inconveniences and dangers incident to using the old-fashioned kettles are thus avoided.

I claim as new, and desire to secure by Letters Patent—

The combination, with the bail-kettle, formed after the fashion of a common tea-kettle, made of whatever material, the pieces D D, substantially as and for the purposes herein shown and described.

The above specification of my invention signed by me, this 15th day of September, 1868.

JOS. H. DOWNING.

Witnesses:
C. V. WILMOTT,
JOSHUA FAWCETT.